United States Patent [19]

Blum et al.

[11] Patent Number: 4,970,270

[45] Date of Patent: Nov. 13, 1990

[54] PROCESS FOR THE PREPARATION OF MOISTURE HARDENING BINDER COMBINATIONS, THE COMBINATIONS OBTAINABLE BY THIS PROCESS AND THEIR USE

[75] Inventors: Harald Blum, Wachtendonk; Josef Pedain, Cologne; Christian Wamprecht, Krefeld, all of Fed. Rep. of Germany

[73] Assignee: Bayer Aktiengesellschaft, Leverkussen-Bayerwerk, Fed. Rep. of Germany

[21] Appl. No.: 504,733

[22] Filed: Apr. 2, 1990

Related U.S. Application Data

[63] Continuation of Ser. No. 237,180, Aug. 29, 1988, abandoned.

[30] Foreign Application Priority Data

Sep. 8, 1987 [DE] Fed. Rep. of Germany ....... 3730066

[51] Int. Cl.$^5$ ................................................ G08F 8/30
[52] U.S. Cl. .................................. 525/375; 525/329.6; 525/379
[58] Field of Search ...................... 525/375, 374, 327.6

[56] References Cited

U.S. PATENT DOCUMENTS 4,279,793  7/1981  Wellner et al. .
4,391,957  7/1983  Becker et al. .
4,404,379  9/1983  Hajek et al. .

FOREIGN PATENT DOCUMENTS 0001065  6/1979  European Pat. Off. .
0070536  1/1983  European Pat. Off. .
2853477  6/1980  Fed. Rep. of Germany .

*Primary Examiner*—Bernard Lipman
*Attorney, Agent, or Firm*—Connolly and Hutz

[57] ABSTRACT

Moisture hardening binders for lacquer and coating compositions are prepared by mixing with exclusion of moisture, and with or without reacting:

(A) 30 to 99 parts by weight of at least one compound containing at least two intramolecular carboxylic acid anhydride moieties with (B) 1 to 70 parts by weight of organic compounds containing blocked amino groups from which free primary aminos, secondary aminos or both are formed under the influence of moisture characterized in that compounds (B) are organic compounds containing hexahydropyrimidine or tetrahydroimidazole moieties, with or without other blocked amino moieties in addition to the hexahydropyrimidine or tetrahydroimidazole moieties, the quantitative proportions of the individual components (A) and (B) being so chosen, taking into account any spontaneous addition reaction which may take place between components (A) and (B) in the absence of moisture, such that the resulting composition contains from 0.25 to 50 anhydride moieties for each hexahydropyrimidine or tetrahydroimidazole moiety.

14 Claims, No Drawings

PROCESS FOR THE PREPARATION OF MOISTURE HARDENING BINDER COMBINATIONS, THE COMBINATIONS OBTAINABLE BY THIS PROCESS AND THEIR USE

This application is a continuation of application Ser. No. 07/237,180, filed Aug. 29, 1988, now abandoned.

This invention relates to a process for the preparation of binder combinations which harden under the influence of moisture, consisting substantially of organic compounds containing at least two intramolecular carboxylic acid anhydride groups and compounds containing hexahydropyrimidine or tetrahydroimidazole groups, to the combinations obtained by this process and to their use as moisture hardening lacquers or coating compounds or for the preparation of such lacquers or coating compounds.

BACKGROUND OF THE INVENTION

The use of combinations of organic compounds containing at least two intramolecular carboxylic acid anhydride groups per molecule, in particular copolymers containing succinic acid anhydride groups and polyhydroxyl compounds as binders for lacquers and coating compounds has already been disclosed in EP-A-48 128. The application of the principle of this prior publication to the reaction of amines with anhydrides, however, encounters the difficulty that the reaction of amines with anhydrides proceeds very rapidly even at room temperature with the elimination of anhydride and the formation of cross-linked products. The consequently extremely short working life of such combinations have therefore hitherto prevented the use of combinations of polyanhydrides and polyamines in coating systems.

The possibility of a solution to this problem is indicated in DE-OS 2 853 477 which describes mixtures of polyanhydrides and blocked polyamines which have a sufficiently long pot life but harden to form cross-linked products when water is added. Ketimines and aldimines obtained by the reaction of polyamines with ketones or aldehydes are described as suitable blocked polyamines.

As polyanhydrides there are mentioned compounds containing at least two cyclic carboxylic acid anhydride groups per molecule, in particular reaction products of polyols with cyclic dianhydrides in a ratio of hydroxyl groups to anhydride groups of 1:2 or copolymers of an unsaturated cyclic anhydride with polyunsaturated compounds or α-olefines.

The olefinically unsaturated compounds to be used for the preparation of the copolymers are treated only very briefly in the general description of DE-OS 2 853 477 and in particular there is no indication of the proportions in which the individual monomers are to be used for the preparation of the copolymers. The specific disclosure in the examples of practical embodiments is limited to copolymers of butadiene oil and maleic acid anhydride in proportions of 1:1 and to copolymers of wood oil and maleic acid anhydride. These copolymers have, however, certain disadvantages in that their combinations with bis-ketimines or bis-aldimines would lead to strongly discoloured products. Moreover, the coatings obtained from coating compounds containing unsaturated oils such as butadiene oil or wood oil as their binder components would readily become brittle and would not be weather resistant.

As disclosed in the examples of practical embodiment in DE-OS 2 853 477, the binders specifically described there require the use of dimethylformamide as solvent for working them up and the solids contents, which are only about 20%, are unacceptable.

Another possibility of increasing the pot life lies in the use of oxazolanes instead of amines.

Water hardenable compositions of oxazolanes and polyanhydrides are already known in principle from DE-OS 2 610 406, according to which oxazolanes are combined with polyanhydrides for the preparation of water hardenable sealing compounds and adhesives. Reaction products of polyunsaturated fatty acids with maleic acid anhydride and polyanhydrides of $C_3$-$C_6$-alkyl(meth)acrylate and maleic acid anhydride, in particular butyl acrylate and maleic acid anhydride, are described as suitable polyanhydrides.

Experiments carried out by the present Applicants have shown that the systems specifically described in DE-OS 2 610 406 leave much room for improvement with regard to their suitability for the preparation of high quality, colourless lacquer films of great hardness and resistance to solvents and chemicals. This applies both to the systems based on copolymers of maleic acid anhydride and butyl acrylate described in the Examples and to the systems based on reaction products of maleic acid anhydride and polyunsaturated fatty acid esters, which result in end products which tend to yellow.

It was therefore an object of the present invention to provide new binder combinations based on polyanhydrides and modified polyamines which would be suitable for the preparation of high quality systems which could be cured under the influence of atmospheric moisture, which binder systems would have a sufficiently long pot life and would harden within acceptable lengths of time to form clear films resistant to yellowing and to solvents.

BRIEF DESCRIPTION OF THE INVENTION

This problem is solved by means of the process according to the present invention in which certain polyanhydrides are combined with compounds containing hexahydropyrimidine or tetrahydroimidazole groups of the type described below.

Thus, this invention relates to a process for the preparation of moisture hardening binder compositions by mixing, with or without reacting, the following:

(A) from 30 to 99 parts by weight of at least one compound containing at least two intramolecular carboxylic acid anhydride groups
under exclusion of moisture with
(B) from 1 to 70 parts by weight of organic compounds containing hexahydropyrimidine or tetrahydroimidazole groups,
wherein the quantitative ratios of the individual components are so chosen, taking into account any addition reaction between (A) and (B) which may take place spontaneously in the absence of moisture, such that the resulting mixture contains from 0.25 to 50 anhydride groups for each hexahydro- pyrimidine or tetrahydroimidazole group.

The invention also relates to the binder combinations obtainable by this process.

Lastly, the invention relates to the use of the binder combinations obtainable by the process according to the invention as lacquers or coating compounds which can harden under the influence of moisture or for the preparation of such lacquers or coating compounds.

The molecular weights of components (A) and (B) referred to hereinafter can be determined by gel permation chromotography in the case of molecular weights of above about 1000 and calculated from the kind and stoichiometry of the starting materials in the case of molecular weights of below about 1000.

DETAILED DESCRIPTION OF THE INVENTION

In more detail, the present invention relates to a process for the preparation of moisture hardening binder compositions which comprises mixing, with or without reaction, (A) from 30 to 99 parts by weight of at least one compound containing at least two intramolecular carboxylic acid anhydride groups
under exclusion of moisture with (B) from 1 to 70 parts by weight of organic compounds containing blocked amino groups from which free primary and/or secondary amino groups are formed under the influence of moisture,
optionally with the addition of solvents and/or other auxiliary agents and additives known in lacquer technology, characterised in that the components used as compounds (B) are organic compounds containing hexahydropyrimidine or tetrahydroimidazole groups and optionally containing hydrogen atoms which are reactive with acid anhydride groups and optionally in addition containing other blocked amino groups, the quantitative ratios of the individual components are so chosen, taking into account any addition reaction between (A) and (B) which may take place spontaneously in the absence of moisture, that the resulting mixture contains from 0.25 to 50 anhydride groups for each hexahydropyrimidine or tetrahydroimidazole group.

The invention also relates to the binder combinations obtainable by this process.

Lastly, the invention relates to the use of the binder combinations obtainable by the process according to the invention as lacquers or coating compounds which can harden under the influence of moisture or for the preparation of such lacquers or coating compounds.

The starting components (A) to be used in the process according to the invention may be any organic compounds containing at least two intramolecular acid anhydride groups per molecule. Examples of suitable "polyanhydrides" of this type include low molecular weight cyclic dianhydrides such as pyromellitic acid dianhydride and benzophene-3,4,3', 4'-tetracarboxylic acid anhydride.

Graft products, Diels-Alder adducts or en adducts of maleic acid anhydride and polyunsaturated substances such as liquid low molecular weight polybutadienes, butadiene copolymers, soya bean oil, linseed oil, wood oil, tall oil, castor oil, coconut oil or ground nut oil are also suitable.

Reaction products containing at least two anhydride groups and obtained by the reaction of at least difunctional alcohols, amines or amino alcohols with excess quantities of dianhydrides are suitable.

Compounds (A) are preferably "copolymers containing succinic acid anhydride", which in the context of the present invention means copolymers of maleic acid anhydride with other olefinically unsaturated monomers of the type described below containing 37 succinic acid anhydride groups" corresponding to the following formula

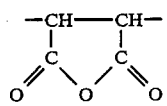

such as are incorporated in the polymer in the process of polymerisation or copolymerisation of maleic acid anhydride.

The preferred starting components (A) include copolymers prepared in known manner from (a) from 4.5 to 45 parts by weight of maleic acid anhydride, (b) from 5 to 80 parts by weight of monomers of the formula

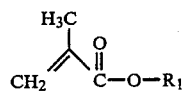

and/or the formula

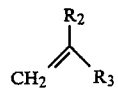

and (c) from 15 to 92 parts by weight of monomers of the formula

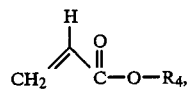

in which formulae, $R_1$ denotes an aliphatic or cycloaliphatic hydrocarbon group with 1 to 12 carbon atoms optionally containing oxygen, sulphur or nitrogen as hetero atom, $R_2$ stands for hydrogen, a methyl or ethyl group or chlorine or fluorine, $R_3$ stands for an aliphatic hydrocarbon group containing 2 to 15 carbon atoms, a cycloaliphatic hydrocarbon group containing 5 to 10 carbon atoms, an araliphatic hydrocarbon group containing 7 to 18 carbon atoms, an aromatic hydrocarbon group containing 6 to 12 carbon atoms, chlorine, fluorine, a nitrile group or a hydrocarbon group containing 2 to 18 carbon atoms and containing one or more hetero atoms selected from oxygen, sulphur and nitrogen in the form of ether, ester, amide, urethane, urea, thioester. thioether, oxirane, ketone, lactam or lactone groups, and $R_4$ conforms to the same definition as $R_1$. It is particularly preferred to use starting components (A) according to the invention consisting of copolymers of maleic acid anhydride with monomers (b) and (c) corresponding to the above general formulae in which $R_1$ stands for a straight chained or branched aliphatic hydrocarbon group containing 1 to 8 carbon atoms, $R_2$ stands for ,hydrogen or a methyl group, $R_3$ stands for an aromatic hydrocarbon group containing 6 to 12 carbon atoms (including aromatic groups containing aliphatic substituents), a nitrile group, a carboxylate group containing 2 to 9 carbon atoms, an alkoxy group containing 2 to 7 carbon atoms or an aminocarbonyl group optionally carrying on the nitrogen atom an alkyl substituent with 1 to 6 carbon atoms which may contain ether bridges, and $R_4$ conforms to the same definition as $R_1$ Typical examples of suitable or preferred groups $R_1$ to $R_4$ include the methyl, ethyl, n-propyl, isopropyl, n-butyl, isobutyl, n-pentyl, n-hexyl, 2-ethylhexyl, n-octyl, n-decyl and n-dodecyl groups.

Hydrogen, methyl, ethyl, chlorine and fluorine are typical examples of suitable or preferred groups denoted by $R_2$.

Typical examples of suitable or preferred groups denoted by $R_3$ include aliphatic groups of the type just mentioned above as examples of $R_1$ with the exclusion of hydrogen and methyl: and, in addition, phenyl, cyclohexyl, 2-, 3- and 4-methylphenyl, propoxy, n-butoxy, acetyl, propionyl, n-butyryl and N-methoxymethyl-aminocarbonyl groups.

Preferred components (A) are also those in which (a) from 4.5 to 45 parts by weight, in particular from 4.5 to 19 parts by weight of maleic acid anhydride, (b) from 25 to 80 parts by weight, in particular from 41 to 65 parts by weight, of monomers of the formulae

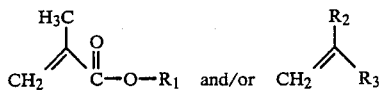

and (c) from 20 to 75 parts by weight, in particular from 25 to 50 parts by weight of monomers of the formula

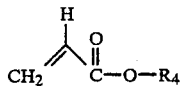

are present in a copolymerised form.

Particularly preferred components (A) are copolymers conforming to the above definition in which from 40 to 140 parts by weight of other monomers selected from styrene, vinyltoluene, α-methylstyrene, α-ethylstyrene, diethylstyrenes substituted in the nucleus and optionally consisting of isomeric mixtures, isopropylstyrenes, butylstyrenes and methoxystyrenes, ethyl vinyl ethers, n-propyl vinyl ethers, isopropyl vinyl ethers, n-butylvinyl ethers, isobutylvinyl ethers, vinyl acetate, vinyl propionate, vinyl butyrate and any mixtures of these comonomers are contained in a copolymerised form per 100 parts by weight of maleic acid anhydride, optionally in addition to other comonomers.

The preferred components (A), i.e. the copolymers containing succinic acid anhydride, generally have a weight average molecular weight of from 1500 to 75,000, preferably from 3000 to 50,000 and most preferably from 5000 to 35,000. Their anhydride equivalent weight (=quantity in "g" containing 1 mol of anhydride groups) is in the region of 4900 to 217, preferably from 2100 to 326. They are prepared in known manner by a radically initiated copolymerisation, preferably in the presence of organic solvents. The polymerisation medium may be any solvent conventionally used in the lacquer industry which is inert towards the monomers and copolymers under the conditions of polymerisation. The following, for example, are suitable: Esters such as ethyl acetate, propyl acetate, butyl acetate, isopropyl acetate, isobutyl acetate, sec.-butyl acetate, amyl acetate, hexyl acetate, benzyl acetate, ethyl propionate, butyl propionate, methyl glycol acetate, ethyl glycol acetate, butyl glycol acetate, ethyl diglycol acetate, ethyl glycol acetate. methyl diglycol acetate, butyl diglycol acetate, butyrolactone and propylene glycol methyl ether acetate, e.g. ethers such as diisopropylether, dibutylether, tetrahydrofuran, dioxane and dimethyldiglycol, hydrocarbons such as petroleum hydrocarbons, oil of turpentine, solvent naphtha, terpenes, hexane, heptane, octane, cyclohexane, toluene, xylene and ethyl benzene, ketones such as acetone, methyl ethyl ketone, methyl isobutyl ketone, methyl-n-amyl ketone, methyl isoamyl ketone, diethyl ketone, ethyl butyl ketone, diisopropyl ketone, cyclohexanone, methyl cyclohexanone or isophorone or any mixtures of such solvents.

The copolymerisation is generally carried out with solids contents of from 30 to 95% by weight.

Part or all of the solvent is generally introduced into the reaction vessel and the monomer mixture, the initiator and optionally part of the solvent are continuously added. Stirring is continued for some time after all the components have been added. Polymerisation is terminated after a monomer conversion of more than 96%, preferably more than 99%. Reactivation by subsequent addition of small quantities of initiator may be necessary for obtaining the desired monomer conversion. If certain compositions of monomer starting materials are used, the copolymer may contain substantial quantities of residues of maleic acid anhydride monomers after polymerisation. For reasons of cost and in case these residues deleteriously affect the product for its intended use or the properties of the product, it is advantageous to reduce this residual monomer content by distillation or by reactivation with initiator, optionally together with the addition of small quantities of a monomer mixture which readily copolymerises with maleic acid anhydride, e.g. a mixture of styrene and butyl acrylate.

Polymerisation may be carried out by introducing part of the maleic acid anhydride into the reaction vessel together with the solvent or adding the maleic acid anhydride dropwise but more rapidly than the other monomers. This modified method of preparation may in certain cases improve the compatibility of the components of the binder combination.

Conversion of the monomers is determined by measuring the solids content of the reaction mixture and is checked by gas chromatographic analysis of the residual monomer content.

It is preferable to use radical formers of the type which are suitable for reaction temperatures of from 60° to 180° C., e.g. organic peroxides such as dibenzoyl peroxide, di-tert.-butyl peroxide, dilauryl peroxide, tert.-butylperoxy-2-ethylhexanoate, tert.-butylperoxy maleate, tert..butylperoxy benzoate, dicumyl peroxide and didecanoyl peroxide and azo compounds such as 2,2'-azo-(bis)-(2,4-dimethyl-valeronitrile), 2,2'-azo-bis-(isobutyronitrile), 2,2'-azo-bis-(2,3-dimethyl-butyronitrile) and 1,1'-azo-bis-(1-cyclohexane nitrile).

The initiators may be used in quantities of from 0.5 to 10% by weight, based on the total quantity of monomers. Substances which regulate the molecular weight, such as n-dodecylmercaptan, tert.-dodecylmercaptan, mercaptoethanol, etc. may be used in quantities of from 0 to 10% by weight.

Component (B) consists of compounds with a weight average molecular weight of from 86 to 10,000, preferably from 128 to 3000, especially from 350 to 1500, containing blocked amino groups, or mixtures of such compounds. It is an essential feature of this invention that the compounds which constitute component (B) contain, on statistical average, at least 0.01, preferably 0.5 to 4 and especially 1 to 3 structural units of the following general formula

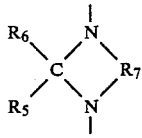

per molecule, optionally in addition to other blocked amino groups. In the above formula.

$R_5$ and $R_6$ stand for identical or different groups and denote hydrogen, aliphatic hydrocarbon groups containing 1 to 18 carbon atoms, cycloaliphatic hydrocarbon groups containing 5 to 10 carbon atoms. araliphatic hydrocarbon groups containing 7 to 18 carbon atoms or phenyl groups, and the two groups $R_5$ and $R_6$ together with the carbon atom of the heterocyclic ring may also form a 5-membered or 6-membered cycloaliphatic ring, provided that only one of the symbols $R_5$ and $R_6$ stands for hydrogen, and $R_7$ denotes a divalent aliphatic hydrocarbon group containing 2 to 4 carbon atoms, under the condition that 2 or 3 carbon atoms are situated between the two nitrogen atoms.

It is particularly preferred to use hexahydropyrimidines or tetrahydroimidazoles containing structural units of the above-mentioned general formula in which $R_5$ and $R_6$ stand for identical or different aliphatic hydrocarbons containing 1 to 4 carbon atoms but one of these symbols may also stand for hydrogen, and $R_7$ stands for an ethylene or trimethylene group.

The compounds containing hexahydropyrimidine or tetrahydroimidazole groups present in component (B) may contain other functional groups in addition to the aforesaid groups. These additional groups may be (i) hydroxyl and/or amino groups which are reactive with acid anhydride groups and/or (ii) blocked amino groups which are substantially inert towards acid anhydride groups in the absence of moisture, selected from oxazolane, aldimine and ketimine groups.

Compounds corresponding to the following general formula are examples of hexahydropyrimidines or tetrahydroimidazoles which may be used as component (B) or as the proportion of component (B) required for the invention:

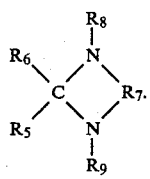

In the above formula, $R_5$ to $R_7$ have the meanings or preferred meanings indicated above and $R_8$ and $R_9$, which may be identical or different, stand for hydrogen, aliphatic hydrocarbon groups with 1 to 10, preferably 1 to 4 carbon atoms, cycloaliphatic hydrocarbon groups with 5 to 10, preferably 6 carbon atoms, or aromatic hydrocarbon groups with 7 to 15, preferably 7 carbon atoms, among which the hydrocarbon groups mentioned, especially the aliphatic hydrocarbon groups, may contain hetero atoms such as oxygen, nitrogen or sulphur in the form of ether, ester, amide, urethane, oxirane, ketone, lactam, urea, thioether, thioester or lactone groups and the groups may also contain hydroxyl or amino groups which are reactive with acid anhydride groups.

Preferably, however, the hexahydropyrimidines or tetrahydroimidazoles used as component (B) or as the proportion of component (B) essential for this invention contain at most one group capable of reacting with acid anhydride groups. This means that preferably not more than one of the groups denoted by $R_8$ or $R_9$ is hydrogen or a group containing, as substituents, hydroxyl or amino groups capable of reacting with acid anhydride groups. It is particularly preferred to use compounds which are inert towards acid anhydride groups in the absence of moisture, i.e. compounds which contain no active hydrogen atoms and no groups of the aforesaid type capable of reacting with acid anhydride groups.

The preparation of such compounds containing hexahydropyrimidine or tetrahydroimidazole groups may be prepared in known manner by the reaction of the corresponding aldehydes or ketones with the corresponding polyamines.

Suitable aldehydes or ketones are those corresponding to the following general formula

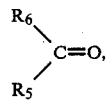

preferably with a molecular weight of from 72 to 200 (ketones) or from 58 to 128 (aldehydes).

The following are examples of suitable aldehydes and ketones: Acetone. methyl ethyl ketone, methyl propyl ketone, methyl isopropyl ketone, methyl-n-butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, isophorone, methyl-tert.-butyl ketone, 5-methyl-3-heptanone, 4-heptyl ketone, 1-phenyl-2-propanone, acetophenone, methyl nonyl ketone, 3,3,5-trimethyl-cyclohexanone, formaldehyde. acetaldehyde, propionaldehyde, butyraldehyde, isobutyraldehyde, trimethyl acetaldehyde, 2,2-dimethylpropanol, 2-ethylhexanal, 3-cyclohexene-1-carboxyaldehyde, hexanal, heptanal, octanal, valeraldehyde, benzaldehyde, tetrahydrobenzaldehyde, hexahydrobenzaldehyde, acrolein, croton aldehyde, propargyl aldehyde. p-tolyl aldehyde, 2-methylpentanal, 3-methylpentanal, phenylethanal, and 4-methylpentanal.

The following are preferred aldehydes and ketones: Butyraldehyde, isobutyraldehyde, trimethylacetaldehyde, 2,2-dimethylpropanal, 2-ethylhexanal, hexanal. 3-cyclohexane-1-carboxyaldehyde, heptanal, octanal, hexahydrobenzaldehyde, 2-methylpentanal, cyclohexanone. cyclopentanone, methyl isopropyl ketone, acetone, 3 3 5-trimethylcyclohexanone and methylcyclohexanone.

Mixtures of various ketones or of various aldehydes as well as mixtures of ketones with aldehydes may, of course, also be used for obtaining special properties.

The polyamines used for the preparation of component (B) are in particular organic compounds containing at least two primary and/or secondary amino groups.

Suitable polyamines include, for example, those corresponding to the following general formula:

wherein $R_7$, $R_8$ and $R_9$ have the meanings or preferred meanings already mentioned above, particularly preferred polyamines being those in which $R_8$ and $R_9$ stand for identical or different simple alkyl groups such as methyl, ethyl, n-propyl, isopropyl, n-butyl, isobutyl, tert.-butyl, n-pentyl or n-hexyl groups or at least one of the groups denoted by $R_8$ or $R_9$ is a group of the type obtained by the addition of a hydrogen atom of a primary amino group to an olefinically unsaturated compound. Examples of olefinically unsaturated compounds suitable for the preparation of such modified polyamines include derivatives of (meth)acrylic acid, such as esters, amides or nitriles thereof and, for example, aromatic vinyl compounds such as styrene, α-methylstyrene, vinyl toluene and, for example, vinyl esters such as vinyl acetate, vinyl propionate or vinyl butyrate, and, for example, vinyl ethers such as ethyl vinyl ether, propyl vinyl ether or butyl vinyl ether, and mono- and diesters of fumaric acid, maleic acid and tetrahydrophthalic acid. Preferred polyamines corresponding to the last mentioned general formula also include those in which at least one of the groups $R_8$ and $R_9$ is a primary amino alkyl group containing 2 to 4 carbon atoms.

Particularly preferred polyamines are 1,2-propylene. diamine, 1,3-propylenediamine, 1,2- and 1,3-butylenediamine, diethylenetriamine and the above mentioned products of addition of these polyamines or of ethylenediamine to olefinically unsaturated compounds.

The N-substituted hexahydropyrimidines and tetrahydroimidazoles may be obtained by methods known in the literature, consisting of a cyclising condensation of polyamines of the type mentioned above with carbonyl compounds of the type mentioned above accompanied by the elimination of water.

For these reactions, the amine component is normally introduced into the reaction vessel together with an entrainer and the carbonyl compound is added dropwise with stirring at room temperature. The reaction mixture is then heated on a water separator until either the theoretical quantity of water has separated or no further separation of water takes place. The entrainer and any unreacted blocking agent is then removed by distillation. The N-substituted hexahydropyrimidines or tetrahydroimidazoles obtained are then ready for use without further purification although distillative purification may be carried out if exceptional standards of purity are required. Examples of suitable entrainers include toluene, xylene, petroleum hydrocarbons, cyclohexane, octane, methylene chloride and chloroform. Acid catalysts such as p-toluene sulphonic acid, $AlCl_3$, HCl or $H_2SO_4$ may be added to accelerate the reaction. The polyamines and the carbonyl compounds are generally put into the reaction in a molar ratio of from 1:1 to 1:1.5.

When the hexahydropyrimidines or tetrahydroimidazoles are prepared by the reaction of ketones or aldehydes with diamines of the type exemplified above containing two primary or one primary and one secondary amino group (the latter includes not only simple primary-secondary diamines but in particular also reaction products of diprimary diamines with simple olefinically unsaturated compounds of the type exemplified above in a molar ratio of 1:1), then the resulting hexahydropyrimidines or tetrahydroimidazoles correspond to the above general formula in which $R_8$ and/or $R_9$ is hydrogen. When the polyamines used correspond to the last mentioned general formula in which $R_8$ and/or $R_9$ stand for a primary or secondary aminoalkyl group or a hydroxyalkyl group, then the reaction products are hexahydropyrimidines or tetrahydroimidazoles corresponding to the above mentioned general formula in which $R_8$ and/or $R_9$ stand for alkyl groups containing the corresponding substituents. All these compounds containing active hydrogen atoms may be subjected to further modifying reactions by way of the reactive amino groups or the hydroxyl groups. It is possible by these means to obtain higher functional hexahydropyrimidines or tetrahydroimidazoles which are suitable as components (B) according to the invention or also compounds containing blocked amino groups of the type mentioned above in addition to at least one hexahydropyrimidine or tetrahydroimidazole group, which are also suitable for use as component (B). For these modification reactions, it is preferable to use hexahydropyrimidines or tetrahydroimidazoles corresponding to the above general formula in which only one of the groups $R_8$ and $R_9$ is hydrogen or an amino-substituted or hydroxyl-substituted alkyl group and which are otherwise inert towards the components used for the modification reaction.

Suitable reactants for the preparation of these higher functional compounds, i.e. suitable "modifying agents", include in particular organic polyisocyanates, polyepoxides, polycarboxylic acids, polycarboxylic acid anhydrides, lower polycarboxylic acid esters, in particular methyl esters, and compounds containing at least two olefinically unsaturated double bonds capable of undergoing an addition reaction with secondary amines.

Examples of suitable polyisocyanates for these modifying reactions, include aliphatic, cycloaliphatic, araliphatic, aromatic and heterocyclic polyisocyanates such as those described, for example, by W. Siefken in Justus Liebigs Annalen der Chemie, 562, pages 75 to 136, e.g. 1,4-tetramethylenediisocyanate, 1,6-hexamethylene diisocyanate, 1,12-dodecanediisocyanate, cyclobutane-1.3-diisocyanate, cyclohexane-1,3-diisocyanate, cyclohexane-1,4-diisocyanate, 1-isocyanato-3,3,5-trimethyl-5-isocyanatomethyl-cyclohexane, 2,4- and 2,6-hexahydrotolylenediisocyanate, hexahydro-1,3- and -1,4-phenylene diisocyanate, perhydro-2,4'- and/or -4,4'-diphenylmethane diisocyanate, 1,3-phenylenediisocyanate, 1,4-phenylenediisocyanate, 2,4.tolylenediisocyanate, 2.6-tolylenediisocyanate, diphenylmethane-2,4'- and/or 4,4'-diisocyanate, naphthylene-1,5-diisocyanate, mixtures of these and other polyisocyanates, polyisocyanates containing carbodiimide groups (e.g. DE-PS 10 92 007), polyisocyanates containing allophanate groups (e.g. GB-PS 994 890), polyisocyanates containing isocyanurate groups (e.g. DE-PS 10 22 789 and DE-PS 12 22 067), polyisocyanates containing urethane groups (e.g. US-PS 33 94 164), polyisocyanates prepared by the reaction of at least difunctional hydroxyl compounds with an excess of at least difunctional isocyanates, polyisocyanates containing biuret groups (e.g. DE-PS 11 01 394) and prepolymeric or polymeric substances containing at least two isocyanate groups.

Representatives of these compounds to be used according to the invention are described e.g. in High Polymers, Vol. XVI, "Polyurethanes, Chemistry and Technology", Interscience Publishers, New York, London, Volume I, 1962. pages 32–42 and 45–54 and Volume II, 1964, pages 5–6 and 198 199, and in Kunststoff Handbuch, Volume VII, Vieweg-Höchtlen, Carl-Hanser-Verlag, Munich, 1966, pages 45–71.

Suitable polyepoxides for the above-mentioned modifying reaction include, for example, aliphatic, cycloaliphatic, araliphatic, aromatic and heterocyclic compounds containing at least two epoxide groups. e.g. epoxidized esters of aliphatic, polybasic acids with unsaturated monohydric alcohols, glycidyl ethers of polyhydroxyl compounds, glycidyl esters of polycarboxylic acids and copolymers containing epoxide groups.

Examples of suitable polycarboxylic acids for the modifying reaction include aliphatic, cycloaliphatic, araliphatic, aromatic and heterocyclic substances containing at least two carboxyl groups, e.g. adipic acid, dimeric fatty acid, phthalic acid, terephthalic acid, isophthalic acid, fumaric acid, maleic acid, succinic acid, trimellitic acid, pyromellitic acid, copolymers containing (meth)acrylic acid, acid polyesters and acid polyamides.

Instead of carrying out the modifying reaction with the acids mentioned above as examples, the reaction may be carried out using the corresponding acid anhydrides (if the acids form intramolecular anhydrides) or the corresponding simple alkyl esters, in particular methyl esters.

Suitable compounds for the modifying reaction containing at least two olefinic double bonds of the type described above include in particular derivatives of acrylic acid and methacrylic acid, such as hexanediol-bis-(meth)acrylic acid ester, trimethylolpropane-tris-(meth)acrylic acid ester, pentaerythritol tetra(meth)acrylic acid ester, OH-functional polyesters and polyacrylates esterified with acrylic acid, diethylene glycol dimethacrylic acid ester, reaction products of polyepoxides with (meth)acrylic acid and reaction products of polyisocyanates with hydroxyalkyl(meth)acrylate.

The modifying reaction for the preparation of higher functional components (B) may be carried out not only with the above mentioned hexahydropyrimidines and tetrahydroimidazoles containing active hydrogen atoms or mixtures of several such compounds but also with mixtures containing these compounds together with other blocked polyamines which have at least one free hydroxyl or amino group capable of reacting with the modifying agent. These include in particular ketimines, aldimines and oxazolanes containing a hydroxyl or a primary or second amino group.

Polyamines containing ketimine or aldimine groups and still containing at least one free primary or secondary amino group may be obtained, for example, by the reaction of at least difunctional amines with ketones and/or aldehydes of the type described above for the preparation of the hexahydropyrimidines or tetrahydroimidazoles, using the reactants in such equivalent ratios that at least one amino group is left free.

The following are examples of suitable polyamines: Diprimary aliphatic and cycloaliphatic diamines such as tetramethylenediamine, hexamethylenediamine, isophoronediamine, bis-(4-aminocyclohexyl)-methane, bis-(aminomethyl-hexahydro-4,7-methanoindane, 1,4-cyclohexanediamine, 1,3-cyclohexanediamine, 2-methyl-cyclohexanediamine, 4-methyl-cyclohexanediamine. 2,2,5-trimethyl-1,6-hexanediamine, 2,2,4-butanediol-bis (3-aminopropyl)ether, 2,5-diamino-2,5-dimethylhexane, bis-(1,4-aminomethyl-cyclohexane and bis-(4-amino-3,5-dimethyl-cyclohexyl)-methane.

If, for example, the polyamines used contain at least one secondary amino group in addition to two primary amino groups, the reaction with aldehydes or ketones may give rise to aldimines or ketimines which have at least one free secondary amino group (if the reaction has been carried out with an equivalent ratio of primary amino groups to carbonyl groups of 1:1) or which have free primary amino groups in addition to at least one secondary amino group (if the carbonyl compounds have been used in less than the equivalent quantity, based on the primary amino groups). Examples of such primary-secondary polyamines include diethylenetriamine, triethylenetetramine, tetraethylenepentamine, dipropylenetriamine and tripropylenetetramine.

The aldimines or ketimines may also be prepared from prepolymers containing primary amino groups, i.e. compounds containing at least two amino end groups and having a molecular weight of up to 5000. Examples of such compounds include the aminopolyethers known from polyurethane chemistry, e.g. those described in EP-A-0081701, and reaction products containing amide, urethane or urea groups obtained by the reaction of at least difunctional carboxylic acids, isocyanates or epoxides with polyamines. These reaction products must contain at least two amino groups, at least one of which must be a primary amino group.

Preparation of the polyamines containing ketimine or aldimine groups and at least one reactive primary or secondary amino group which has not been blocked is carried out by reacting the above mentioned starting components in such equivalent proportions of amino groups to aldehyde or keto groups that at least one primary or secondary amino group will not be blocked. The reaction is generally carried out at temperatures from 75° to 180° C. and in the presence of an entrainer and continued until the calculated quantity of water has been split off or until no more water separates.

Compounds containing oxazolane groups and at least one reactive primary or secondary amino group or a hydroxyl group may be obtained, for example, by reacting hydroxylamines which in addition to their hydroxyl group and a secondary amino group contain at least one further hydroxyl group and/or a primary or secondary amino group, or by the reaction of suitable hydroxylamines containing a hydroxyl group and a primary amino group, in suitable equivalent ratios with ketones and/or aldehydes of the type described above for the preparation of hexahydropyrimidines and tetrahydroimidazoles. The following are examples of suitable hydroxylamines: Bis-(2-hydroxyethyl)amine, bis-(2-hydroxypropyl)-amine, bis-(2-hydroxybutyl)amine, bis-(3-hydroxypropyl)-amine, bis-(3-hydroxyhexyl)amine, N-(2-hydroxypropyl)-N-(6-hydroxyhexyl)-amine. 2-amino-2-methyl-1-propanol, 2-amino-2-ethyl-1-propanol, 2-amino.2-propyl-1-propanol, 2-amino.2-methyl-1,3-propanediol, 2-amino-3-methyl-3-hydroxybutane and aminoethanol.

Preparation of the hydroxylamines which contain oxazolone groups and still have at least one free primary or secondary amino group or a hydroxyl group is carried out by reaction of the above mentioned starting components, using an equivalent ratio of amino or hydroxyl groups to aldehyde or ketone groups such that at least one primary or secondary amino group or one hydroxyl group will not be blocked but remains available for the subsequent reaction with the component used as modifying agent.

The preparation of oxazolones by the reaction of hydroxylamines with carbonyl compounds is known in the literature and is generally carried out at temperatures of 60° to 180° C. in the presence of an entrainer until the calculated quantity of water has been split off or no further separation of water takes place.

If the "modifying agents" mentioned above as examples are reacted with hexahydropyrimidines or tetrahydroimidazoles containing active hydrogen atoms, the products obtained are higher functional hexahydropyrimidines or tetrahydroimidazoles. If, on the other hand, the modifying agents are reacted with mixtures of (i) hexahydropyrimidines or tetrahydroimidazoles containing active hydrogen atoms and (ii) aldimines, ketimines and/or oxazolones of the type exemplified above, then the products obtained are modified hexahydropyrimidines or tetrahydroimidazoles which have aldimine, ketimine or oxazolone groups chemically attached thereto. The compounds obtained in the former case are hexahydropyrimidines or tetrahydroimidazoles corresponding to the general formula indicated above in which at least one of the groups $R_8$ or $R_9$ is a group containing at least one further hexahydropyrimidine and/or tetrahydroimidazole group as substituent. The compounds obtained in the latter case are hexahydropyrimidines or tetrahydroimidazoles corresponding to the aforesaid general formula in which at least one of the groups $R_8$ or $R_9$ is a group containing at least one aldimine, ketimine and/or oxazolone group as substituent. If the aldimines, ketimines and/or oxazolones of the type exemplified above are used in excess of the quantity of hexahydropyrimidines or tetrahydroimidazoles with active hydrogen atoms in the modification reaction, the mixtures of blocked polyamines obtained only in part contain hexahydropyrimidine and tetrahydroimidazole groups. This explains the finding frequently made that component (B) may consist of mixtures of blocked polyamines which on statistical average contain less than one hexahydropyrimidine or tetrahydroimidazole group per molecule. The aforesaid modification reactions therefore can give rise to a wide variety of compounds or mixtures of compounds suitable for use as component (B). Modified hexahydropyrimidines or tetrahydroimidazoles suitable for use as component (B) according to the invention may also be obtained by other methods, for example by using polyamines corresponding to the last-mentioned general formula in which one of the groups $R_8$ or $R_9$ is an amino alkyl group (for example, diethylenetriamine) and quantities of aldehydes or ketones exceeding the quantity required for the formation of hexahydropyrimidine or tetrahydroimidazole so that other blocked amino groups, such as ketimine or aldimine groups, may be obtained in a one-shot process in addition to the hexahydropyrimidine or tetrahydroimidazole groups.

The modification reaction is normally carried out in a solvent of the type exemplified above at reaction temperatures of from 30° to 180° C., optionally in a water separator.

This reaction is generally carried out with an equivalent ratio of reactive groups of the blocked polyamines to the reactive groups of the "modifying agent" although the "modifying agent" could be used in less than the equivalent amount, for example in 0.75 to 0.99 times the equivalent quantity.

If in addition to the hexahydropyrimidines or tetrahydroimidazoles, other blocked polyamines of the type exemplified above containing groups capable of reacting with the "modifying agent" are used, then these blocked polyamines are at most used in quantities producing, on statistical average, not more than 50, preferably not more than 10 aldimine, ketimine and/or oxazolane groups for each hexahydropyrimidine or tetrahydroimidazole group in the resulting modified reaction product. Compounds corresponding to the following formulae are examples of modified hexahydropyrimidines and tetrahydroimidazoles suitable for use as component (B) which may be obtained by the aforesaid modification reactions:

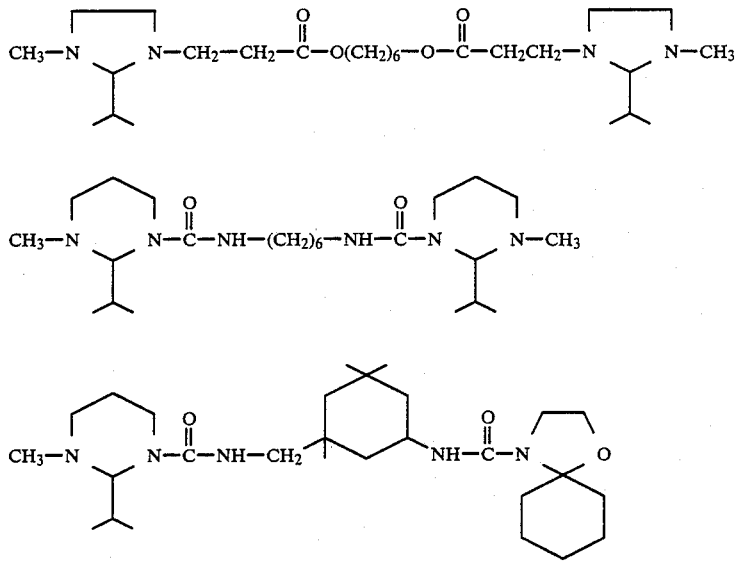

-continued

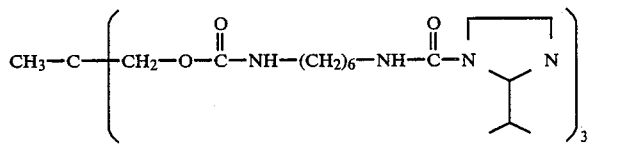

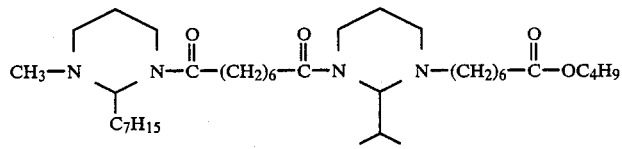

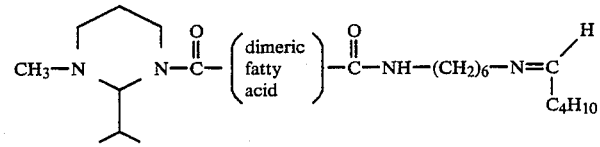

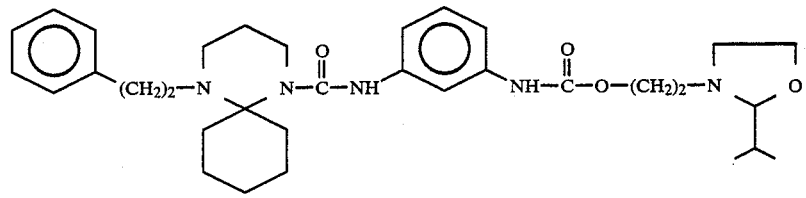

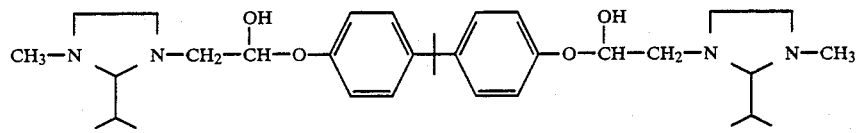

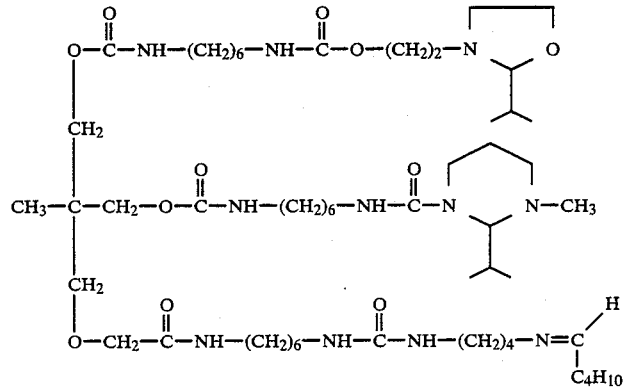

Additional blocked polyamines which are free from hexahydropyrimidine and tetrahydroimidazole groups may be used as auxiliary agents and additives for carrying out the process according to the invention, optionally in addition to other auxiliary agents and additives. These additional polyamines are mainly aldimines, ketimines or oxazolones which are not chemically linked to the hexahydropyrimidines or tetrahydroimidazoles according to the invention. Both compounds of this type containing hydroxyl or amino groups and compounds of this type which are unreactive with acid anhydride groups in the absence of moisture may be used. These auxiliary agents and additives are prepared by the methods indicated above but the nature and proportions of the starting materials for the preparation of the blocked amines are chosen so that the end products do not contain any free hydroxyl or primary or secondary amino groups.

These auxiliary agents and additives may be used in such quantities in the process according to the invention that at least 2, preferably not less than 10 mol-% of the blocked amino groups present in the binder combinations according to the invention finally obtained are hexahydropyrimidine or tetrahydroimidazole groups, these percentages including not only these groups present in component (B) but also any other blocked amino groups present in component (B) as well as blocked amino groups introduced with auxiliary agents and additives of the last mentioned type.

To carry out the process according to the invention, starting components (A) and (B) and any auxiliary agents and additives used are mixed together, inert organic solvents or diluents of the type exemplified above being optionally present before, during or after preparation of the mixtures of the individual components. These solvents or diluents may already be present during the preparation of one or more of the starting components as already described above, for example, for the preparation of the copolymers which contain succinic acid anhydride groups. Other suitable solvents and diluents for the preparation of the binder combination include, for example, alcohols which in certain cases may have a positive effect on the properties of the binder combinations. Examples of such additional solvents and diluents include ethanol, n-propanol, isopropanol, n-butanol, sec.-butanol, tert.-butanol, n-pentanol, isopentanol, n-hexanol, isohexanol, cyclopentanol, cyclohexanol, heptanol, octanol, methyl glycol, ethyl glycol, propyl glycol, isopropyl glycol, butyl glycol, methyl diglycol. ethyl diglycol, propyl diglycol, butyl diglycol. methyl triglycol, hexyl glycol, propylene glycol monomethyl ether, tripropylene glycol monomethyl ether, dipropylene glycol monomethyl ether, alkyl glycollates, alkyl lactates, 2-ethylbutanol, 2-ethylhexanol, 3-methoxybutanol, diacetone alcohol, furfuryl alcohol and tetrahydrofurfuryl alcohol. The solvents and diluents should be substantially free from water to ensure a sufficient time for processing the mixtures. Solvents and diluents are generally used in the quantities required for adjusting the combinations according to the invention to suitable working viscosities. The solids content of the compositions according to the invention which are to be used according to the invention is generally from 20 to 90% by weight but could in principle be further reduced by using suitable low molecular weight copolymers containing succinic acid anhydride.

According to a preferred embodiment of the process according to the invention, the blocked polyamines used consist entirely of compounds (B) which are free from any groups capable of reacting with anhydride groups in the absence of moisture and in which the blocked amino groups are all hexahydropyrimidine and/or tetrahydroimidazoles of the type mentioned. The preferred compositions according to the invention prepared in this way contain from 45 to 90 parts by weight of polyanhydrides (A) and from 10 to 55 parts by weight of compounds (B) containing hexahydropyrimidine or tetrahydroimidazole.

If hexahydropyrimidines or tetrahydroimidazoles are used as component (B) or if compounds containing groups which are reactive with acid anhydride groups in the absence of moisture, i.e. in particular hydroxyl groups or primary or secondary amino groups, are used as auxiliary agents and additives containing blocked amino groups, then the products obtained from the process are complex mixtures of reaction products of copolymers (A) containing amide or ester groups and reactive compounds (B) and/or reactive blocked polyamines used as auxiliary agents or additives. In addition to these reaction products, the end products of the process may also contain excess quantities of unreacted copolymer (A) or of any blocked polyamines which are unreactive with acid anhydride groups. The aforesaid reaction products containing amide or ester groups may be reaction products containing blocked amino groups (reaction products of copolymers A with hexahydropyrimidines, tetrahydroimidazoles, aldimines, ketimines or oxazolanes containing chemically bound active hydrogen atoms) or reaction products which are free from blocked amino groups (reaction products of copolymers A with polyamines or hydroxylamines optionally present as a mixture with blocked polyamines for whose preparation they were used).The term "blocked polyamines containing hydrogen atoms reactive with acid anhydride groups" is used in the context of the present invention to denote not only blocked polyamines which contain reactive hydrogen atoms in a chemically bound form but also blocked polyamines which are present as mixtures with excess polyamines or hydroxylamines used for their preparation.

In all the variations for carrying out the process according to the invention, the nature and quantitative proportions of the individual components are so chosen that the binder combinations finally obtained contain from 0.25 to 50 anhydride groups, preferably from 0.5 to 10 and especially from 0.6 to 5 anhydride groups, for each hexahydropyrimidine or tetrahydroimidazole group, taking into account any reaction taking place spontaneously. between acid anhydride groups and groups which are reactive with acid anhydride groups, in particular amino or hydroxyl groups. A relatively large excess of anhydride groups over the aforesaid blocked amino groups is advisable when the latter are present together with other blocked amino groups of the type mentioned above. The molar ratio of acid anhydride groups to all blocked amino groups after termination of any spontaneous reaction between acid anhydride groups and groups capable of reacting with acid anhydride groups is preferably from 0.5:1 to 2:1.

For the usability of the products obtained by the process according to the invention, it is to a large extent immaterial whether the reaction which nay take place spontaneously between the copolymers (A) and the groups capable of reacting with acid anhydride groups has already been completed or not. If desired, however, this reaction may be terminated by brief heating to 40-100° C. before the products of the process are used for the purpose according to the invention. The process according to the invention is otherwise preferably carried out at room temperature.

The process according to the invention may, of course, be carried out with any desired mixtures of different individual components (A) and (B).

The products of the process according to the invention are generally liquid at room temperature and they are sufficiently stable in storage in the absence of water and generally harden rapidly in the presence of atmospheric moisture after they have been applied to a substrate.

Cross-linked films are generally obtained at room temperature. The hardening process, which is in any case very rapid, may be further accelerated by drying at elevated temperatures, advantageously at temperatures from 80° to 130° C. for 10 to 30 minutes.

When the blocked amino groups are exceptionally resistant to hydrolysis, this force drying at elevated temperatures may be necessary for obtaining optimum properties.

The lacquers and coating compounds which contain the products of the process according to the invention as binders and are to be used for the purpose of the invention may contain the conventional auxiliary agents and additives used in lacquer technology, such as pigments, fillers, levelling agents, antioxidants or UV absorbents.

These auxiliary agents and additives should be as far as possible anhydrous and are preferably incorporated with the starting components, generally components (A), before the process according to the invention is carried out.

The lacquers and coating compounds containing the products of the process of the invention as binders generally have a pot life of from 1 to 24 hours in the absence of moisture. This pot life may be increased or reduced as required by suitable choice of the reactants. The lacquers and coating compounds may be applied to any, optionally pretreated substrates such as metal, wood, glass, ceramics, stone, concrete, plastics, textiles, leather, cardboard or paper by the usual methods, for example by spraying, spread coating, immersion, flooding, casting or application with rollers.

In the following Examples, all the percentages and parts are percentages and parts by weight unless otherwise indicated.

EXAMPLES (I) Preparation of maleic acid anhydride copolymers A

General method of preparation for maleic acid anhydride copolymer $A_1$ to $A_4$:

Part I is introduced into a 4-liter reaction vessel equipped with stirrer and cooling and heating device and is heated to the reaction temperature Part II and Part III are then added in 3 hours and Part IV in 4 hours. The reaction mixture is then stirred at the reaction temperature for 2 hours and optionally partly distilled for a short time.

The reaction temperatures and the compositions of parts I to IV are entered in Table 1 together with the solids contents and viscosities of the maleic acid anhydride copolymer solutions obtained.

TABLE 1

| | (Quantities in g) | | | |
|---|---|---|---|---|
| | $A_1$ | $A_2$ | $A_3$ | $A_4$ |
| Part I | | | | |
| Methoxypropyl acetate | 1200 | 900 | | |
| Butyl acetate | | | 1248 | 1254 |
| Part II | | | | |
| Maleic acid anhydride | 375 | 200 | 262.5 | 127.5 |
| Part III | | | | |
| Ethyl hexyl acrylate | 675 | 100 | 97.5 | |
| Styrene | 450 | 50 | 300 | 225 |
| Methyl methacrylate | | 100 | | 225 |
| Vinyl toluene | | 50 | 75 | |
| α-Methyl styrene | | 150 | | |
| Ethyl acrylate | | 350 | 90 | 450 |
| Butyl acrylate | | | 525 | 322.5 |
| Butyl vinyl ether | | | 150 | |
| Acrylonitrile | | | | 75 |
| n-Dodecylmercaptan | 1.5 | 20 | 7.5 | |
| Vinyl acetate | | | | 75 |
| Part IV | | | | |
| tert.-butylperoctoate[1] | 42.9 | 29 | 53.6 | 53.6 |
| Methoxypropyl acetate | 40.1 | 100 | | |
| Reaction temperature (°C.) | 130 | 120 | 125 | 120 |
| Solids content (%) | 58.9 | 50.3 | 56.7 | 57.0 |
| Viscosity (mPa.s)[2] | 32900 | 790 | 904 | 1190 |

[1]tert.-butylperoctoate is used as a 70% solution in a hydrocarbon mixture
[2]determined at 23° C.

General method of preparation for maleic acid anhydride copolymers $A_5$ to $A_{11}$:

Part I is introduced into a 4-1 reaction vessel equipped with stirrer and cooling and heating device and is heated to the reaction temperature. Part II is added in 4 hours and Part III in 5 hours After one hour's stirring, Part IV and Part V are added at an interval of 15 minutes and the reaction mixture is again stirred for one hour.

The reaction temperatures and the compositions of Parts I to V are entered in Table 2 together with the solids contents and the viscosities of the resulting maleic acid anhydride copolymer solutions.

TABLE 2

| | (Quantities in g) | | | | | | |
|---|---|---|---|---|---|---|---|
| | $A_5$ | $A_6$ | $A_7$ | $A_8$ | $A_9$ | $A_{10}$ | $A_{11}$ |
| Part I | | | | | | | |
| Methoxypropyl acetate | 731 | | | | | | |
| Butyl acetate | | 725 | 447 | 642 | 975 | 798 | 1232 |
| Part II | | | | | | | |
| Maleic acid anhydride | 120 | 352 | 440 | 396 | 264 | 425 | 187.5 |
| Styrene | 180 | 264 | 330 | 308 | 220 | 350 | 169 |
| Butyl acrylate | 900 | 836 | 836 | 1496 | 836 | 1050 | 431 |
| Methyl methacrylate | 300 | 748 | 594 | | 880 | 675 | 425 |
| Butyl acetate | | 1056 | 1320 | 1188 | 792 | 1275 | |
| Methoxypropyl acetate | 280 | | | | | | |
| Part III | | | | | | | |
| tert.-Butyl peroctoate[1] | 64.3 | 63.0 | 110 | 110 | 110 | 98 | 53.5 |
| Part IV | | | | | | | |
| tert.-Butyl peroctoate[1] | 2.1 | 3.1 | 3.1 | 3.1 | 3.1 | 3.6 | 1.8 |
| Part V | | | | | | | |
| tert.-Butyl peroctoate[1] | 2.1 | 3.1 | 3.1 | 3.1 | 3.1 | 3.6 | 1.8 |
| Reaction temperature (°C.) | 126 | 128 | 128 | 125 | 127 | 126 | 124 |
| Solids content (%) | 61.0 | 55.1 | 55.3 | 54.6 | 56.0 | 56.4 | 48.8 |
| Viscosity (mPa.s)[2] | 2220 | 4540 | 2090 | 421 | 1313 | 1090 | 971 |

[1]tert.-Butylperoctoate is used as a 70% solution in a hydrocarbon mixture
[2]Determined at 23° C.

(II) Preparation of cross-linking agents (B) containing hexahydropyrimidine or tetrahydroimidazole groups All reactions are carried out under a nitrogen atmosphere.

B₁

60 g of Ethylene diamine are introduced into a 1—1 reaction vessel equipped with stirrer and cooling and heating means. 128 g of n-butyl acrylate are added dropwise, the temperature rising to 80° C. After 6 hours' stirring at 80° C., the reaction mixture is cooled to 40° C., 69 g of cyclohexane and 86.4 g of isobutyraldehyde are added and the reaction mixture is again heated to the reflux temperature. 22 g of water are removed azeotropically and the solvent and excess blocking reagent are then distilled off. The crude tetrahydroimidazole $B_1$ is obtained.

B₂

171 g of Cyclohexane and 235.2 g of cyclohexanone are weighed into a 1—1 reaction vessel equipped with stirrer and cooling and heating means. 176 g of 1-Amino-3-(methylamino)-propane are then slowly added dropwise with cooling in an ice bath (−10° C.). The reaction mixture is kept at 10° C. for one hour and then heated to the reflux temperature and 34 g of water are removed azeotropically. Solvent and excess blocking agent are distilled off and the crude hexahydropyrimidine $B_2$ is obtained.

B₃

60 g of Ethylene diamine are introduced into a 1—1 reaction vessel equipped with stirrer and cooling and heating device. 100 g of methylmethacrylate are added dropwise, the temperature rising, to 80° C. After 6 hours' stirring at 80° C., the reaction mixture is cooled to 40° C., 62 g of cyclohexane and 86.4 g of isobutyraldehyde are added and the reaction mixture is heated to the reflux temperature. 31 g of water are then removed azeotropically and solvent and excess blocking reagent are distilled off. Crude tetrahydroimidazole $B_3$ is obtained.

B₄

60 g of Ethylene diamine are introduced into a 1—1 reaction vessel equipped with stirrer and cooling and heating means. 116 g of hydroxyethyl acrylate are slowly added dropwise, the reaction temperature rising to 80° C. After 6 hours' stirring at 180° C., the reaction mixture is cooled to 40° C., 66 g of cyclohexane and 86.4 g of isobutyraldehyde are added and the mixture is reheated to the reflux temperature. 14 g of water are removed azeotropically and solvent and excess blocking agent are then distilled off. The crude tetrahydroimidazole $B_4$ is obtained.

B₅

176 g of N,N'-Dimethylenediamine and 171 g of cyclohexane are introduced under a nitrogen atmosphere into a 1—1 reaction vessel equipped with stirrer and cooling and heating means and the reaction mixture is cooled to 10° C. 173 g of isobutyraldehyde are then added dropwise at 10° C. Stirring is continued for 1 hour at 10° C. and the temperature is then raised to the reflux temperature and 45 g of water are distilled off. The reaction mixture is then fractionally distilled in a water jet vacuum (12 to 16 Torr). The tetrahydroimidazole $B_5$ is obtained.

B₆

158.4 g of Isobutyraldehyde and 171 g of cyclohexane are weighed into a 1—1 reaction vessel equipped with stirrer and cooling and heating means and the reaction mixture is cooled to 10° C. in an ice bath. 103 g of diethylenetriamine are added dropwise under an atmosphere of nitrogen and the reaction mixture is stirred for one hour at 10° C. The reaction mixture is then heated to the reflux temperature and 35.7 g of water are distilled off azeotropically. Excess blocking agent and solvent are then distilled off and the crude tetrahydroimidazole cross-linking agent $B_6$ is obtained.

B₇

88 g of 1-Amino-3-(methylamino)-propane are introduced into a 1—1 reaction vessel equipped with stirrer and cooling and heating means. 128 g of butyl acrylate are added dropwise and the temperature is raised to 80° C. After 6 hours' stirring at 80° C., the reaction mixture is cooled to 40° C., 75.6 g of cyclohexane and 86.4 g of isobutyraldehyde are added and the reaction mixture is heated to the reflux temperature. 17.2 g of water are removed azeotropically and excess blocking agent and solvent are then distilled off. The crude hexahydropyrimidine $B_7$ is obtained.

B₈

200 g of Isobutyraldehyde and 133 g of cyclohexane are introduced under a nitrogen atmosphere into a 1—1 reaction vessel equipped with stirrer and cooling and heating means and the reaction mixture is cooled to 10° C. in an ice bath. 176.6 g of 1-Amino-3-(methylamino)-propane are slowly added dropwise and the reaction mixture is stirred for one hour at 10° C. It is then heated to reflux temperature until 52 g of water have separated off. After removal of the solvent and unreacted blocking agent by distillation, hexahydropyrimidine $B_8$ is obtained.

B₉

The crude hexahydropyrimidine $B_8$ is fractionally distilled in a water jet vacuum (12 to 16 Torr) and 5% of the first runnings and last runnings are discarded. 90 g of the resulting hexahydropyrimidine $B_8$ are stirred under a nitrogen atmosphere together with 53.2 g of hexamethylene diisocyanate. The initially exothermic reaction is maintained at 60° C. for 6 hours by cooling and heating. The bishexahydropyrimidine $B_9$ is obtained.

B₁₀

307.2 g of 2-Ethylhexanal and 171 g of cyclohexane are introduced under a nitrogen atmosphere into a 1—1 reaction vessel equipped with stirrer and cooling and heating means and the reaction mixture is cooled to 10° C. 176 g of 1-Amino-3-(methylamino)-propane are slowly added dropwise at 10° C. and the reaction mixture is then stirred for one hour at 10° C. and heated to the reflux temperature. 41 g of water are separated off azeotropically. The solvent and excess blocking agent are distilled off and the crude hexahydropyrimidine $B_{10}$ is obtained.

B₁₁

149.5 g of Hexahydropyrimidine $B_8$, 282 g of the dimeric fatty acid $^{(R)}$Empol 1010 (product of Unilever) and 185 g of xylene are weighed into a reaction vessel equipped with stirrer and cooling and heating means under a nitrogen atmosphere and the reaction mixture is heated on a water separator until no more water is split off. An approximately 70% solution of the bis-hexahydropyrimidine $B_{11}$ is obtained.

$B_{12}$ 149.5 g of Hexahydropyrimidine $B_8$ and 112.5 g of butyl acetate are introduced into a reaction vessel equipped with stirrer and cooling and heating means and heated to 70° C. 113 g of 1,6-hexanediol-bis-acrylic acid ester are then rapidly added dropwise and the reaction mixture is stirred for 4 hours at 80° C. An approximately 70% solution of the bis-hexahydropyrimidine $B_{12}$ is obtained.

$B_{13}$ 216.7 g of Methoxypropyl acetate and 116.1 g of a polyisocyanate containing isocyanurate groups and based on hexamethylene diisocyanate, consisting mainly of N,N',N''-tris-(6-isocyanatohexyl)-isocyanurate, are introduced under a nitrogen atmosphere into a reaction vessel equipped with stirrer and cooling and heating means. A mixture of 29.9 g of hexahydropyrimidine $B_8$ and 70.7 g of an oxazolone which has been obtained by the reaction of one equivalent of diethanolamine with one equivalent of isobutyraldehyde with elimination of water is then added dropwise at 50° C., the temperature rising to 70° C. Stirring is then continued for 10 hours. An approximately 50% solution of the cross-linking agent $B_{13}$ containing the hexahydropyrimidine groups and oxazolane groups in a ratio of 1:2 is obtained.

$B_{14}$ 103 g of Diethylenetriamine, 44 g of 1-amino-3-(methylamino)-propane and 99 g of toluene are weighed at room temperature into a reaction vessel equipped with stirrer and cooling and heating means, 118 g of isobutyraldehyde are added dropwise and the reaction mixture is heated to the reflux temperature. 29 g of water (theoretical quantity: 27 g) are then separated in a water separator. The reaction mixture is then cooled to 60° C., 84 g of hexamethylene diisocyanate are added dropwise and the mixture is stirred for 4 hours.
An approximately 80% solution of cross-linking agent $B_{14}$ containing on statistical average two aldimine groups and one hexahydropyrimidine group is obtained.

$B_{15}$ 149.5 g of hexahydropyrimidine $B_8$ are weighed into a reaction vessel equipped with stirrer and cooling and heating means. 111 g of isophorone diisocyanate are then added dropwise at 50° C. and stirring is continued for 4 hours at 60° C. Cross-linking agent $B_{15}$ containing two hexahydropyrimidine groups is then dissolved to form an approximately 80% solution in butyl acetate.

$B_{16}$

One equivalent of trimethylolpropane and 4 equivalents of hexamethylene diisocyanate are stirred at 70° C. in a reaction vessel equipped with stirrer and cooling and heating means until the isocyanate content amounts to 62.5% of the original value. 167.1 g of butyl acetate are added to 200 g of this preliminary product and 189.8 g of cross-linking agent $B_8$ are then added dropwise at 50° C. After 4 hours' stirring at 60° C., the cross-linking agent, polyhexahydropyrimidine $B_{16}$, is obtained as an approximately 70% solution.

$B_{17}$ 74.7 g of Hexahydropyrimidine $B_8$ and 88.3 g of an oxazolone of diethanolamine and isobutyraldehyde are introduced into a reaction vessel equipped with stirrer and heating and cooling means, together with 247 g of butyl acetate. 84 g of hexamethylene diisocyanate are then added dropwise under a nitrogen atmosphere at 60° C. and stirring is continued for 10 hours. A 50% solution of cross-linking agent $B_{17}$ containing hexahydropyrimidine and oxazolane groups is obtained.

$B_{18}$ 339 g of a Bis-epoxide based on 2,2-bis-(4-hydroxyphenyl)-propane ($(R)$Lekutherm X 20, BAYER AG) are introduced into a reaction vessel equipped with stirrer and cooling and heating means and heated to 50° C. 73 g of n-butylamine and 88 g of 1-amino-3-(methylamino)-propane are then added dropwise and the temperature is raised to 120° C. After the addition of 164.6 g of toluene, the reaction mixture is stirred at 120° C. for 6 hours and cooled to 60° C. 158.4 g of isobutyraldehyde are added dropwise and the water of reaction is then separated in a water separator. Cross-linking agent $B_{18}$ containing mainly oxazolane and hexahydropyrimidine groups as reactive centres is obtained after removal of the toluene.

$B_{19}$ 232.3 g of the Polyisocyanate mentioned under $B_{13}$ and 456.6 g of methoxypropyl acetate are weighed under a nitrogen atmosphere into a reaction vessel equipped with stirrer and cooling and heating means and heated to 60° C. A mixture of 59.8 g of hexahydropyrimidine $B_8$, 70.7 g of an oxazolane of one equivalent of diethanolamine and one equivalent of isobutyraldehyde, and 93.8 g of a bis-ketimine of one equivalent of diethylene triamine and two equivalents of methyl isobutyl ketone still containing one free secondary amino group is then added dropwise and the reaction mixture is stirred for 6 hours at 70° C. A 50% solution of cross-linking agent $B_{19}$ is obtained This cross-linking agent contains, on statistical average, one hexahydropyrimidine group, one oxazolane group and two ketimine groups.

$B_{20}$ 864 g of Cyclohexane dimethanol, 1368 g of ε-caprolactone and 558 g of dimethyldiglycol are stirred for 4 hours at 140° C. in a reaction vessel equipped with stirring and cooling and heating means. The reaction mixture is then cooled to 50° C., 168 g of hexamethylene diisocyanate are added dropwise to 232.5 g of the 80% preliminary product obtained, and stirring is continued until the isocyanate value is 50% of the original value. 157.8 g of cross-linking agent $B_8$ are then slowly added. The bis-hexahydropyrimidine $B_{20}$ is then obtained after 6 hours at 70° C. This product is diluted to a solids content of 60% with 268 g of dimethyldiglycol.

$B_{21}$ 300 g of a 70% solution of a polyfunctional isocyanate ($(R)$Desmodur Z 4370, Bayer AG, equivalent weight about 365) and 276.7 g of dimethyldiglycol are introduced into a reaction vessel equipped with stirrer and cooling and heating means and heated to 50° C. 46.6 g of cross-linking agent $B_8$ and 110.1 g of an oxazolane of 1 part of diethanolamine and 1 part of isobutyraldehyde are added dropwise in one hour. The reaction mixture is then stirred for 6 hours at 70° C. A 50% solution of the poly-crosslinking agent $B_{21}$ is obtained.

$B_{22}$ 126 g of 3,4-Epoxycyclohexylmethyl-3', 4'-epoxycyclohexane carboxylate (Diepoxide 126, Degussa AG) and 71.4 g of toluene are heated to 50° C. in a reaction vessel equipped with stirrer and cooling and heating means. After the dropwise addition of 36.5 g of n-butylamine and 44 g of 1-amino-3-(methylamino)-propane the reaction mixture is heated to 110° C. and stirred for 3 hours. After cooling to 50° C., 79.2 g of isobutyraldehyde are added dropwise, the reaction mixture is heated to the reflux temperature, and the water of reaction is removed azeotropically. Cross-linking agent $B_{22}$ is obtained as an 80% solution.

$B_{23}$ 1023 g of Butyl acetate are heated to 125° C. under a nitrogen atmosphere in a 2-1 flask equipped with stirrer and cooling and heating means. A mixture of 100 g of glycidyl methacrylate, 200 g of styrene, 300 g of n-butylacrylate and 400 g of methyl methacrylate is added dropwise in four hours and 57.1 g of tert.-butylperoctoate are added in 5 hours. After 2 hours' stirring at 128° C., a copolymer solution having a solids content of 49.7% is obtained. 500 g of the copolymer solution are introduced into a 1—1 flask equipped with stirrer and cooling and heating means, 26.7 g of cross-linking agent $B_8$ are added dropwise and the reaction mixture is heated to 120° C. and then stirred for 3 hours. A 52.0% solution of cross-linking agent $B_{23}$ consisting of a copolymer containing hexahydropyrimidine groups is obtained.

$B_{24}$ 103 g of Diethylenetriamine and 60 g of cyclohexane are introduced into a 1—1 reaction vessel equipped with stirrer and cooling and heating means. 72 g of isobutyraldehyde are then added dropwise and 17.8 g of water are removed in a water separator. The tetrahydroimidazole derivative obtained, which still contains one primary amino group, is freed from cyclohexane by distillation. After the addition of 1 mol of an oxazolane of diisopropanolamine and 2-ethylhexanal still containing a free hydroxyl group, 168 g of hexamethylene diisocyanate are slowly added dropwise at 60° C. and the reaction mixture is stirred for 6 hours. After dilution with methoxypropyl acetate, an approximately 50% solution of a cross-linking agent containing one urethane group and one urea group is obtained. This cross-linking agent contains, on statistical average, one tetrahydroimidazole and one oxazolane group as reactive centres.

(III) Process according to the invention

The maleic acid anhydride copolymers (A) and the cross-linking agent containing hexahydropyrimidine or tetrahydroimidazole groups are mixed together at room temperature and if necessary adjusted to a workable viscosity by the addition of an organic solvent or diluent. The mixtures are drawn out on glass plates by means of a film drawing device to form films having a wet thickness of 120 to 150 μm. The films, which are applied at room temperature, all dry to a tack-free finish within at the most 60 minutes. After ageing, i.e. after 16 to 20 hours' drying at room temperature, clear, cross-linked films with very good mechanical properties are obtained. The compositions of the binder combinations, the drying temperatures, the solids contents, the initial viscosities and pot life and the solvent resistance expressed as the degree of cross-linking are entered in the following Table. The solvent resistance is tested by a wiping test using a wad of cotton wool impregnated with supergrade petrol. The result is given as the number of double strokes at the end of which the film has not undergone any visible change.

The solids contents of the binder compositions were determined by calculation on the basis of the experimentally determined solids contents of the maleic acid anhydride copolymers and the calculated solids contents of the cross-linking agents.

TABLE 2

| | (Examples) | | | | | | |
|---|---|---|---|---|---|---|---|
| | 1 | 2 | 3 | 4 | 5 | 6 | 7 |
| Polyanhydride | 70 g $A_6$ | 70 g $A_7$ | 70 g $A_9$ | 70 g $A_8$ | 70 g $A_5$ | 70 g $A_2$ | 70 g $A_1$ |
| Cross linking agent | 6.8 g $B_{10}$ | 8.5 g $B_{10}$ | 5.1 g $B_{10}$ | 7.6 g $B_{10}$ | 3.7 g $B_{10}$ | 7.7 g $B_{10}$ | 11.4 g $B_{10}$ |
| Molar ratio I[(1)] | 1:0.6 | 1:0.6 | 1:0.75 | 1:0.6 | 1:0.6 | 1:0.6 | 1:0.6 |
| Molar ratio II[(2)] | 1:0.6 | 1:0.6 | 1:0.75 | 1:0.6 | 1:0.6 | 1:0.6 | 1:0.6 |
| Solids content of the binder combination (optionally after the addition of diluent) | 54.7% | 55.0% | 53.8% | 57.9% | 59.6% | 42.3% | 56.4% |
| Initial viscosity (mPa.s) | 2620 | 1370 | 640 | 1170 | 1270 | 600 | 5960 |
| Pot life (hours) | 1 | 1 | 2 | 1 | 2 | 1 | 1 |
| Solvent resistance (super petrol wiping test) | >150 | >150 | >150 | >150 | >150 | >150 | >200 |
| Appearance of film | colourless, clear | colourless, clear | colourless, clear | colourless, clear | colourless, clear | colourless, clear | colourless, clear |

| | 8 | 9 | 10 | 11 | 12 | 13 | 14 |
|---|---|---|---|---|---|---|---|
| Polyanhydride | 70 g $A_3$ | 70 g $A_4$ | 72.6 g $A_6$ | 72.6 g $A_6$ | 72.6 g $A_6$ | 72.6 g $A_6$ | 72.6 g $A_6$ |
| Cross-linking agent | 7.2 g $B_{10}$ | 3.6 g $B_{10}$ | 12.5 g $B_9$ | 10.5 g $B_1$ | 10.5 g $B_2$ | 10.5 g $B_3$ | 12.5 g $B_4$ |
| Molar ratio I[(1)] | 1:0.6 | 1:0.6 | 1:0.9 | 1:0.7 | 1:1.1 | 1:0.9 | 1:0.9 |
| Molar ratio II[(2)] | 1:0.6 | 1:0.6 | 1:0.9 | 1:0.7 | 1:1.1 | 1:0.9 | 1:0.9 |
| Solids content of the binder combination (optionally after the addition of diluent) | 56.1% | 54.8% | 58.1% | 60.1% | 60.1% | 60.1% | 58.1% |
| Initial viscosity (mPa.s) | 2680 | 1370 | 4810 | 6540 | 7810 | 9820 | 8370 |
| Pot life (hours) | 1 | 2 | 1 | 0.5 | 0.5 | 1 | 1 |

TABLE 2-continued (Examples)

| | | | | | | | |
|---|---|---|---|---|---|---|---|
| Solvent resistance (super petrol wiping test) | >150 | >150 | >200 | >150 | >150 | >150 | >150 |
| Appearance of film | colourless, clear | colourless, clear | colourless, clear | colourless, clear | colourless, clear | colourless, clear | colourless, clear |

| | 15 | 16 | 17 | 18 | 19 | 20 | 21 |
|---|---|---|---|---|---|---|---|
| Polyanhydride | 72.6 g $A_6$ | 72.6 g $A_6$ | 72.6 g $A_6$ | 72.6 g $A_6$ | 100 g $A_{10}$ | 100 g $A_{10}$ | 100 g $A_{10}$ |
| Cross-linking agent | 13.3 g $B_5$ | 10.5 g $B_6$ | 10.5 g $B_7$ | 10.5 g $B_8$ | 26.7 g $B_{11}$ | 26.7 g $B_{16}$ | 26.7 g $B_{12}$ |
| Molar ratio I[(1)] | 1:1.5 | 1:1.1 | 1:0.6 | 1:1.2 | 1:0.7 | 1:1 | 1:1.2 |
| Molar ratio II[(2)] | 1:1.5 | 1:2.2 | 1:0.6 | 1:1.2 | 1:0.7 | 1:1 | 1:1.2 |
| Solids content of the binder combination (optionally after the addition of diluent) | 58.2% | 60.1% | 60.1% | 60.1% | 58.9% | 58.9% | 58.9% |
| Initial viscosity (mPa.s) | 2650 | 7310 | 4500 | 4180 | 13020 | 2124 | 1038 |
| Pot life (hours) | 6 | 1 | 3 | 4 | 6 | >8 | 1 |
| Solvent resistance (super petrol wiping test) | >150 | >150 | >150 | >150 | >100 | >200 | >200 |
| Appearance of film | colourless, clear | trace of yellow, clear | trace of yellow, clear | colourless, clear | yellow, clear | colourless, clear | trace of yellow, clear |

| | 22 | 23 | 24 | 25 | 26 | 27 |
|---|---|---|---|---|---|---|
| Polyanhydride | 100 g $A_{10}$ | 100 g $A_{10}$ | 100 g $A_{10}$ | 100 g $A_{10}$ | 70 g $A_{10}$ | 70 g $A_{10}$ |
| Cross linking agent | 37.3 g $B_{17}$ | 37.3 g $B_{13}$ | 23.3 g $B_{15}$ | 23.3 g $B_{14}$ | 12.9 g $B_{18}$ | 23.0 g $B_{19}$ |
| Molar ratio I[(1)] | 1:0.9 | 1:0.3 | 1:1.2 | 1:0.7 | 1:0.5 | 1:0.25 |
| Molar ratio II[(2)] | 1:1.8 | 1:0.9 | 1:1.2 | 1:2.0 | 1:0.9 | 1:1 |
| Solids content of the binder combination (optionally after the addition of diluent) | 54.4% | 54.4% | 60.5% | 60.5% | 59.7% | 54.5% |
| Initial viscosity (mPa.s) | 529 | 1487 | 1454 | 2750 | 6490 | 4500 |
| Pot life (hours) | 16 | 8 | 8 | 1 | 1 | 1 |
| Solvent resistance (super petrol wiping test) | >200 | >200 | >200 | >200 | >200 | >200 |
| Appearance of film | colourless, clear | colourless, clear | colourless, clear | colourless, clear | colourless, slight fog | colourless, clear |

| | 28 | 29 | 30 | 31 | 32 |
|---|---|---|---|---|---|
| Polyanhydride | 70 g $A_{11}$ | 70 g $A_{11}$ | 70 g $A_{10}$ | 80 g $A_{11}$ | 70 g $A_{11}$ |
| Cross-linking agent | 22.3 g $B_{20}$ | 17.5 g $B_{21}$ | 11.1 g $B_{22}$ | 74 g $B_{23}$ | 28 g $B_{24}$ |
| Molar ratio I[(1)] | 1:0.6 | 1:0.15 | 1:0.4 | 1:0.4 | 1:0.4 |
| Molar ratio II[(2)] | 1:0.6 | 1:0.5 | 1:0.8 | 1:0.4 | 1:0.7 |
| Solids content of the binder combination (optionally after the addition of diluent) | 52.4% | 50.0% | 59.4% | 50.6% | 51.6% |
| Initial viscosity (mPa.s) | 1010 | 800 | 2210 | 820 | 1630 |
| Pot life (hours) | 6 | 8 | 3 | 1 | 2 |
| Solvent resistance (super petrol wiping test) | >100 | >150 | >200 | >150 | >150 |
| Appearance of film | colourless, clear | colourless, clear | colourless, clear | colourless, clear | colourless, clear |

[(1)]Molar ratio of acid anhydride groups to hexahydropyrimidine or tetrahydroimiazole groups
[(2)]Molar ratio of acid anhydride groups to all blocked amino groups

What is claimed is:

1. The process for preparation of moisture hardening binder compositions by mixing with exclusion of moisture and with or without reacting:
    (A) 30 to 99 parts by weight of copolymers of maleic acid anhydride with at least two other olefinically unsaturated monomers, said copolymers containing succinic acid anhydride units and having molecular weights Mw in the range of from 1500 to 75,000, and
    (B) 1 to 70 parts by weight of organic compounds containing blocked amino groups from which free primary aminos, secondary aminos or both are formed under the influence of moisture
characterized in that compounds (B) are organic compounds containing hexahydropyrimidine or tetrahydroimidazole moieties, with or without other blocked amino moieties in addition to the hexahydropyrimidine or tetrahydroimidazole moieties, the quantitative proportions of the individual components (A) and (B) being so chosen, taking into account any spontaneous addition reaction which may take place between components (A) and (B) in the absence of moisture, such that the resulting composition contains from 0.25 to 50 anhydride moieties for each hexahydropyrimidine or tetrahydroimidazole moiety.

2. The process according to claim 1 wherein the organic compounds comprising (B) containing hydrogen atoms which are reactive with the acid anhydride moieties of (A).

3. The process according to claim 1 wherein component (A) is a copolymer prepared from
    (a) 4.5 to 45 parts by weight of maleic acid anhydride,
    (b) 5 to 80 parts by weight of monomers of the formula

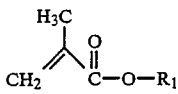

or of the formula

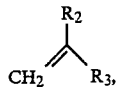

or a mixture of both, and (c) 15 to 92 parts by weight of at least one monomer of the formula

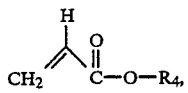

wherein $R_1$ and $R_4$ independent of each other are alkyl having 1 to 12 carbon atoms, cycloalkyl having 3 to 12 carbon atoms, or said alkyl or cycloalkyl having a carbon atom replaced by an oxygen, sulphur or nitrogen hetero atom, $R_2$ is hydrogen, methyl, ethyl, chloro or fluoro, $R_3$ is alkyl containing 2 to 15 carbon atoms, cycloalkyl containing 5 to 10 carbon atoms, aralkyl containing 7 to 18 carbon atoms, aryl containing 6 to 12 carbon atoms, chloro, fluoro, nitrile, or alkyl containing 2 to 18 carbon atoms and containing one or more oxygen, sulphur or nitrogen atoms in the form of ether, ester, amide, urethane, urea, thioester, thioether, oxirane, ketone, lactam or lactone groups.

4. The process according to claim 3 wherein for monomers (A) (b), $R_1$ is straight chained or branched alkyl having 1 to 8 carbon atoms, $R_2$ is hydrogen or methyl and $R_3$ is aryl containing 6 to 12 carbon atoms, nitrile, carboxylate containing 2 to 9 carbon atoms, alkoxy containing 2 to 7 carbon atoms, aminocarbonyl or N-alkylamino-carbonyl having 1 to 6 alkyl carbon atoms.

5. The process according to claim 3 wherein component (A) is a copolymer prepared from 4.5 to 19 parts by weight of (a), 41 to 65 parts by weight of (b) and 25 to 50 parts by weight of (c).

6. The process according to claim 1 wherein component (A) is a copolymer containing, per 100 parts by weight of maleic acid anhydride, from 40 to 140 parts by weight of one or more monomers comprising styrene, vinyl toluene, α-methylstyrene, α-ethylstyrene, methoxystyrenes, butyl styrenes, isopropyl styrenes, diethyl styrenes, ethyl vinyl ethers, n-propyl vinyl ethers, isopropyl vinyl ethers, n-butyl vinyl ethers, isobutyl vinyl ethers, vinyl acetate, vinyl propionate, or vinyl butyrate.

7. The process according to claim 1 wherein component (B) comprises compounds in the molecular weight range of from 86 to 10,000 containing, on statistical average, from 0.5 to 4 structural units of the formula

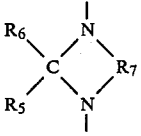

wherein each $R_5$ and $R_6$ is identical or different and each is hydrogen, alkyl having 1 to 18 carbon atoms, cycloalkyl having 5 to 10 carbon atoms, aralkyl having 7 to 18 carbon atoms or phenyl, or both two $R_5$ and $R_6$ together with the carbon atoms of the heterocyclic ring form a 5-membered or 6-membered cycloalkyl ring, and $R_7$ is a divalent alkylene containing 2 to 4 carbon atoms with the proviso that 2 or 3 carbon atoms bridge the two nitrogen atoms.

8. The process according to claim 7 wherein the component (B) compounds additionally contain moieties which are reactive with acid anhydride groups and comprise hydroxyl, primary amino or secondary amino.

9. The process according to claim 7 wherein the component (B) compounds additionally contain reversibly blocked amino moieties which are inert to acid anyhdride groups and comprise oxazolanes, aldimines or ketimines.

10. The process according to claim 1 which further comprises adding to (A) and (B) cross-linking agents which contain reversibly blocked amino groups which are oxazolanes, aldimines or ketimines, free from hexahydropyrimidines and tetrahydroimidazoles, with or without hydroxyl or amino groups capable of reacting with acid anhydride groups.

11. The process according to claim 1 wherein (A) and (B) are mixed with lacquer solvents, lacquer auxiliary agents and lacquer additives.

12. Binder combinations obtainable from the process according to claim 1.

13. Lacquers or coating compositions which contain a binder of hardening under the influence of moisture which contain the binder according to claim 12.

14. The process for preparation of moisture hardening binder compositions by mixing with exclusion of moisture, and with or without reacting:

(A) 30 to 99 parts by weight of copolymers prepared from:
  (a) 4.5 to 45 parts by weight of maleic acid anhydride,
  (b) 5 to 80 parts by weight of monomers of the formula

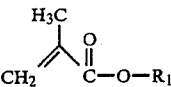

or of the formula

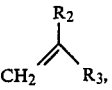

or a mixture of both, and (c) 15 to 92 parts by weight of at least one monomer of the formula

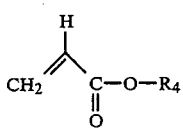

wherein
$R_1$ and $R_4$ independent of each other are alkyl having 1 to 12 carbon atoms, cycloalkyl having 3 to 12 carbon atoms, or said alkyl or cycloalkyl having a carbon atom replaced by an oxygen, sulphur or nitrogen hetero atom,
$R_2$ is hydrogen, methyl, ethyl, chloro or fluoro,
$R_3$ is alkyl containing 2 to 15 carbon atoms, cycloalkyl containing 5 to 10 carbon atoms, aralkyl containing 7 to 18 carbon atoms, aryl containing 6 to 12 carbon atoms, chloro, fluoro, nitrile, or alkyl containing 2 to 18 carbon atoms and containing one or more oxygen, sulphur or nitrogen atoms in the form of ether, ester, amide, urethane, urea, thioester, thioether, oxirane, ketone, lactam or lactone groups, and (B) 1 to 70 parts by weight of organic compounds containing blocked amino groups from which free primary aminos, secondary aminos or both are formed under the influence of moisture characterized in that compounds (B) are organic compounds containing hexahydropyrimidine or tetrahydroimidazole moieties, with or without other blocked amino moieties in addition to the hexahydropyrimidine or tetrahydroimidazole moieties, the quantitative proportions of the individual components (A) and (B) being so chosen, taking into account any spontaneous addition reaction which may take place between components (A) and (B) in the absence of moisture, such that the resulting composition contains from 0.25 to 50 anhydride moieties for each hexahydropyrimidine or tetrahydroimidazole moiety.

* * * * *

UNITED STATES PATENT AND TRADEMARK OFFICE
CERTIFICATE OF CORRECTION

PATENT NO. : 4,970,270

DATED : NOVEMBER 13, 1990

INVENTOR(S) : BLUM ET AL

It is certified that error appears in the above-identified patent and that said Letters Patent is hereby corrected as shown below:

In Column 13, line 5, "oxazolones" should read --oxazolanes--.

In Column 13, line 19, "oxazolones" should read --oxazolanes--.

In Column 13, line 22, "exazolones" should read --oxazolanes--.

In Column 13, line 33, "oxazolone" should read --oxazolanes--.

In Column 13, lines 34-35, "oxazolones" should read --oxazolanes--.

In Column 15, third formula, "$C_4H_{10}$" should read --$C_4H_9$--.

In Column 15, last formula, "$C_4H_{10}$" should read --$C_4H_9$--.

In Column 15, line 59, "oxazolones" should read --oxazolanes--.

UNITED STATES PATENT AND TRADEMARK OFFICE
CERTIFICATE OF CORRECTION

PATENT NO. : 4,970,270

DATED : November 13, 1990

INVENTOR(S) : Blum et al

It is certified that error appears in the above-identified patent and that said Letters Patent is hereby corrected as shown below:

In Column 23, line 24, "oxazolone" should read --oxazolane--.

Signed and Sealed this

Eleventh Day of August, 1992

Attest:

DOUGLAS B. COMER

*Attesting Officer*  *Acting Commissioner of Patents and Trademarks*